(No Model.)

F. C. BRAUCHLER.
NUT LOCK.

No. 280,125.  Patented June 26, 1883.

Witnesses:  
N. A. Low  
J. S. Barker

Inventor:  
Franklin C Brauchler  
by Doubleday & Bliss  
Attys.

N. PETERS. Photo-Lithographer, Washington, D. C.

UNITED STATES PATENT OFFICE.

FRANKLIN C. BRAUCHLER, OF CANTON, OHIO.

NUT-LOCK.

SPECIFICATION forming part of Letters Patent No. 280,125, dated June 26, 1883.

Application filed October 25, 1882. (No model.)

*To all whom it may concern:*

Be it known that I, FRANKLIN C. BRAUCHLER, a citizen of the United States, residing at Canton, in the county of Stark and State of Ohio, have invented certain new and useful Improvements in Nut-Locks, of which the following is a specification, reference being had therein to the accompanying drawings.

Figure 1:
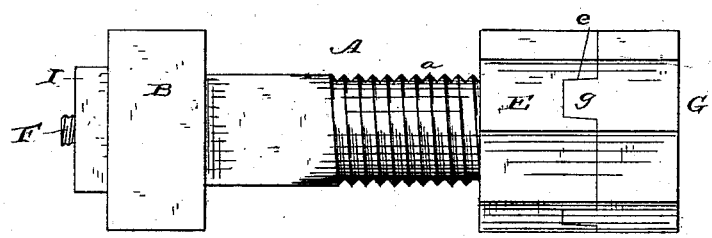
Figure 2:
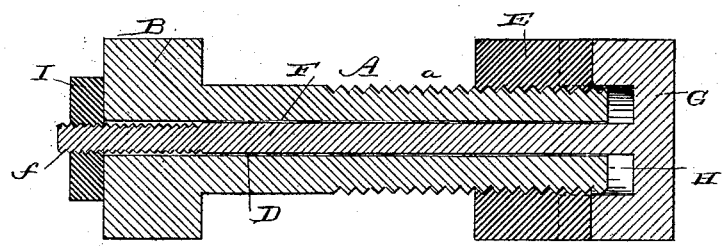
Figure 3:
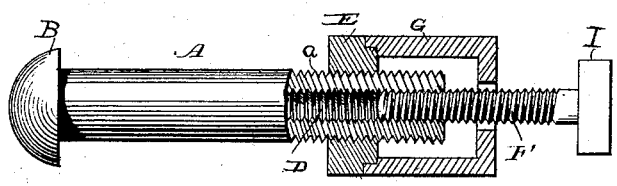
Figure 4:
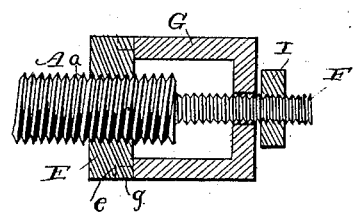

Figure 1 is a side elevation of one form of my improved nut-locking device. Fig. 2 is a central longitudinal section of the same. Figs. 3 and 4 represent modified forms of my nut-lock.

In the drawings, A represents the bolt, having the head B and screw-threaded portion $a$, upon which the nut E travels. I have shown the nut formed with recesses $e$ upon its outer face, though some of the advantages of my invention may be attained even though this face of the nut be made flat and smooth.

G represents a locking-piece of substantially the same shape as the nut E. Upon its inner face it is provided with lugs $g$, corresponding in position with the recesses in the face of nut E, and adapted to enter the recesses, and thus aid in locking the nut in place. This locking-piece is formed with a central recess, H, which passes over but does not engage with the bolt A, thus permitting the part G to engage with the nut E, even though the latter be screwed a considerable distance upon the bolt.

I represents a clamping-piece carried by a bolt, F, of less diameter than the bolt A, and adapted to hold or clamp the part G tightly in place against the outer face of the nut.

In the construction shown in Figs. 1 and 2 the bolt A is provided with a longitudinal hole, D, extending its entire length. Passing through this hole is a stem or bolt, which at one end is connected, either by screw-thread or by being formed integrally therewith, with the locking part G, and at the other end is provided with a screw-thread, $f$. I preferably make the pitch and direction of the threads on bolt F different from those at $a$ on bolt A. Engaging with the threaded part of bolt F is the clamping part or nut I, which, when the parts are locked in position, bears against the head of bolt A.

The means for fastening the recessed locking part G may be slightly modified, as shown in Figs. 3 and 4. In Fig. 3 the interior longitudinal hole, D, is screw-threaded, and the reduced bolt or rod F is threaded to engage therewith, and carries the expanded clamping part or head I, which bears against the outer face of the part G, thus clamping it firmly against the nut E. In this construction the lock G is of the form of a shell passing over the bolt A, and has a hole through which the bolt F passes. In the construction shown in Fig. 4 the reduced bolt or rod F is formed integrally with the bolt A, projecting from the end thereof. It is provided with a screw-thread opposite to that on the bolt A, adapted to engage with and carry the clamping-nut I, by which the part G can be clamped tightly in place.

In the drawings I have shown the hole D as being formed centrally, though some of the purposes of my invention may be attained if this hole be somewhat eccentric.

By having the clamping part which holds the lock G against the outer face of the nut move on lines parallel with the movement of the nut, I am enabled to lock the nut E at almost any desired point on the bolt A, even though it be in such position—as, for instance, in a countersunk recess—that a pin, key, or locking-bolt cannot be passed through said body on a line transverse to the bolt, or when the nut is in such position that the flanges of the lock cannot be passed down by the side of the nut E; hence my invention possesses advantages over any other nut-lock of which I have knowledge.

What I claim is—

1. In combination with the bolt A and nut E, the lock G, situated, as described, entirely outside of the nut E, and adapted to bear against the outer face of the nut, and having a central recess adapted to pass over the bolt, but not engage therewith, a threaded bolt of less diameter than the bolt A, and a movable clamping part, I, which, by means of the thread on the reduced bolt, clamps together the lock, the bolt, and the nut, substantially as set forth.

2. In combination with the bolt A and nut E, traveling thereon, the lock G, adapted to bear against the outer face of the nut and having a central recess adapted to pass over the bolt, but not engage therewith, and a clamping device which travels in lines parallel with the lines of travel of the nut, and adapted to clamp the lock against the nut, substantially as set forth.

3. The combination of nut E, the lock G, having a central recess adapted to pass over the bolt A, but not engage therewith, and adapted to bear against the outer face of the nut, the bolt A, provided with an internal longitudinal hole, and the clamping part I, carried by a screw-threaded bolt, F, of reduced diameter, which enters the hole in the bolt, by which bolt F and part I the nut, lock, and bolt A are clamped together, substantially as set forth.

4. In a nut-lock, a bolt having a hole extending longitudinally throughout its entire length, a nut engaging with the threaded portion, a lock having a central recess which passes over said bolt and engages with the outer face of the nut, a screw-threaded stem passing through the bolt and connected with the lock, and a nut engaging with the screw-threaded stem and bearing against the head of the bolt, substantially as set forth.

5. The combination, with the bolt A, having the screw-threaded portion a and the hole D, of the nut E, provided with recesses e, the lock G, having lugs which engage with said recesses e, the stem or bolt F, attached to said lock and passing through the hole D, and the nut I, substantially as set forth.

In testimony whereof I affix my signature in presence of two witnesses.

FRANKLIN C. BRAUCHLER.

Witnesses:
HENRY FISHER,
J. P. FAWCETT.